Jan. 24, 1961  F. PAPRITZ  2,968,941
TONOMETER
Filed Nov. 29, 1956  2 Sheets-Sheet 1
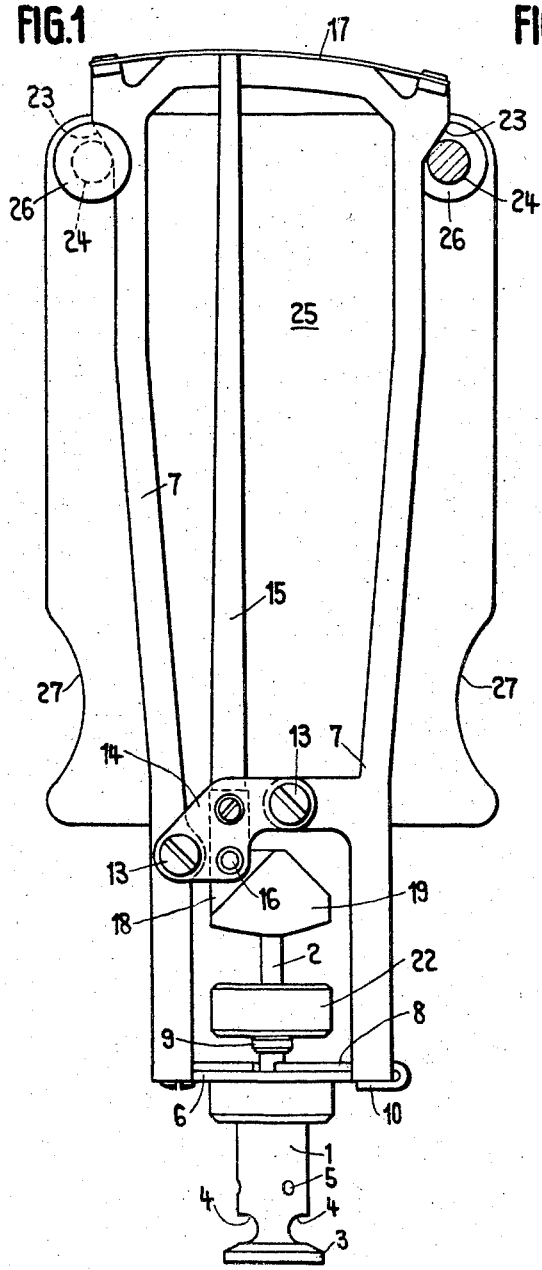
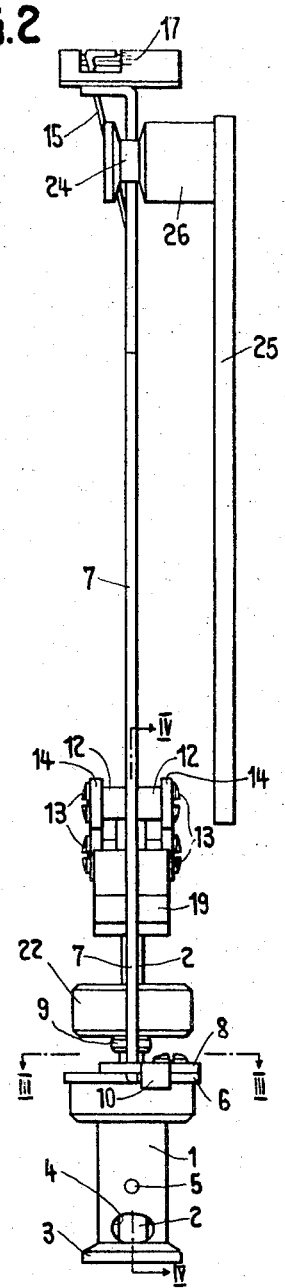
INVENTOR
Franz Papritz Jan. 24, 1961  F. PAPRITZ  2,968,941
TONOMETER
Filed Nov. 29, 1956  2 Sheets-Sheet 2
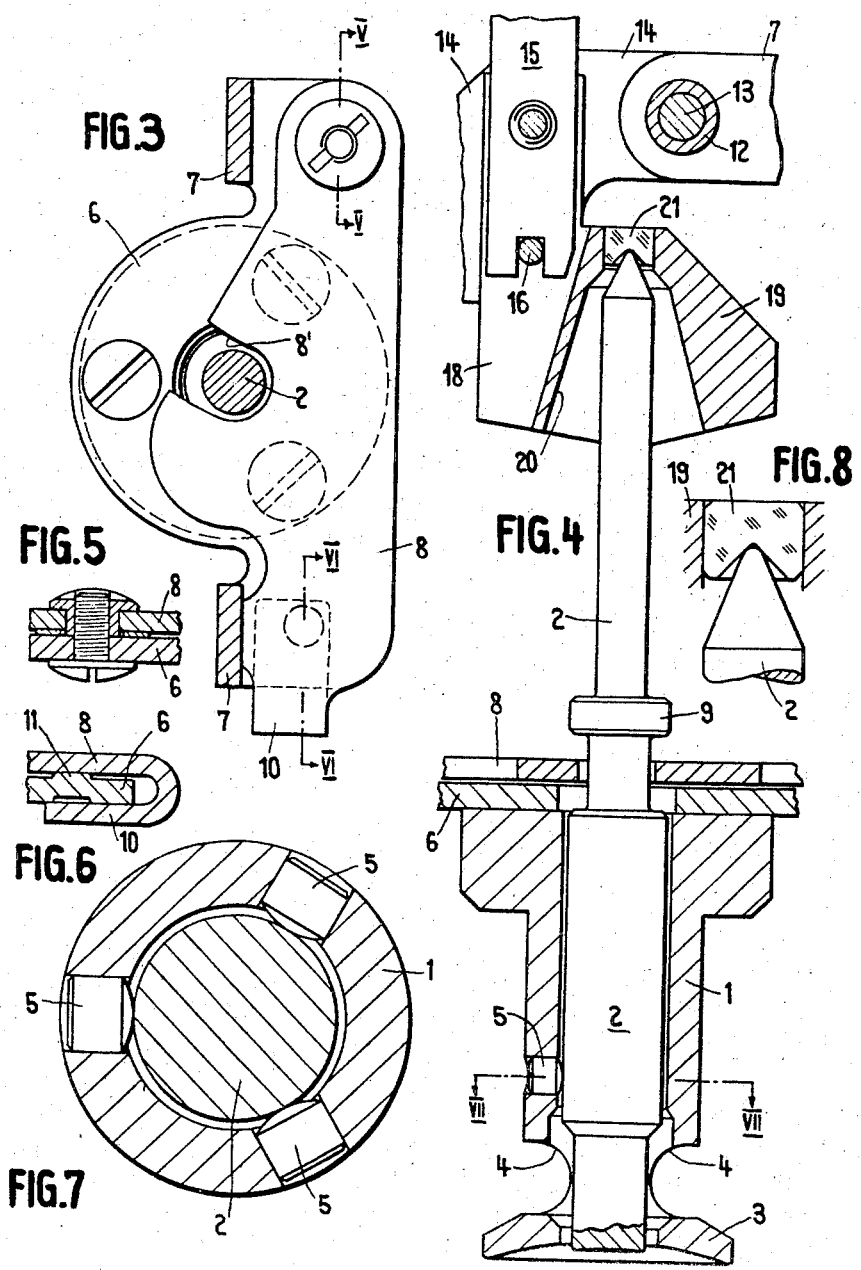

United States Patent Office 2,968,941
Patented Jan. 24, 1961

2,968,941
TONOMETER

Franz Papritz, Liebefeld-Berne, Switzerland, assignor to Haag-Streit A.G., Liebefeld-Berne, Switzerland Filed Nov. 29, 1956, Ser. No. 625,126

Claims priority, application Switzerland Aug. 31, 1956

9 Claims. (Cl. 73—80)

This application relates to a tonemeter for measuring intraocular pressure or the tension of the eyeball and more particularly to a tonemeter of the type having an axially displaceable feeler adapted to be put on the eyeball and a pointer system adapted to be actuated by the displacement of the said feeler.

Tonometers of this kind are known under the designation "tonometer after Professor Schioetz." For measuring the intraocular pressure with tonometers of this type the above mentioned feeler is put onto the eyeball with a predetermined pressure and the amount by which the feeler enters into the eyeball is considered as an indication of the intraocular pressure. The axial displacement of the feeler is transmitted to a pointer system comprising in the well known embodiments of this tonometer a pointer and a weight arranged laterally of the pivot axis of the pointer, this weight continually tending to turn the pointer in the direction of increasing scale division. Usually the weight of the pointer system has the form of a straight or curved lever loosely applied onto the upper end of the said feeler. In the known forms of the tonometer after Schioetz the feeler is slidably held with ample radial clearance in a relatively long stationary cylindrical bearing.

Systematic measurements on great numbers of tonometers have shown, that it is extremely difficult to obtain sufficient accuracy with such known tonometers and it was particularly found that new tonometers having suitable accuracy before practical use did no longer allow a measurement of sufficient accuracy at the end of a relatively short period of practical use. The causes of this rapid decrease in accuracy are substantially as follows: Due to the capillary action of the above mentioned cylindrical bearing of the feeler lachrymal fluid entered into this bearing during the measurement thereby opposing the feeler motion in the bearing and consequently adulterating the measurement. After drying out of the lachrymal fluid the residues remaining in the feeler bearing also opposed or even prevented proper displacement of the feeler in its bearing so that entirely wrong measuring results were obtained with such instruments. In order to avoid as much as possible such sources of adulterated indication the clearance of the feeler in its bearing was made as great as possible. But with thus increased clearance the feeler will be tilted in its bearing in the plane of movement of the pointer system and therefore the position of its upper end on which the weight of the pointer system applies as mentioned above is not well-defined with reference to the pivot axis and the gravity center of the pointer system. Consequently the pressure transmitted from the pointer system onto the feeler is no longer well-defined whereby appreciable adulteration of the measuring result may be caused. Moreover, in all known tonometers the weight of the pointer system slides on the upper end of the feeler during the measurement whereby appreciable friction occurs between the weight and the feeler. Therefore jamming between the weight and the feeler may occur causing adulteration of the measurement.

It is the main object of this invention to do away with the aforementioned disadvantages of known tonometers of the type referred to. The tonometer according to this invention is broadly characterized by small-area bearings for the feeler in the said pointer system and in a stationary part of the tonometer, such small-area bearings allowing a slight swinging or tilting motion of the feeler axis but no radial play of the feeler. Due to the small-area bearings preferably formed by one or more bearing jewels practically no adhesion of the feeler to the bearing surfaces will occur even when lachrymal fluid should enter into such bearings. Since the feeler is also guided in the pointer system without radial or lateral play the pressure exerted onto the feeler from the pointer system is exactly determined for any desired position of the movable parts of the tonometer and this pressure may be, as will be shown in the following description, practically constant over the whole measuring range. Since the feeler is carried along with the pointer system without play no friction will occur between such parts and therefore adulteration of the measurement by such friction is impossible.

The attached drawing shows, by way of example, one embodiment of the tonometer according to this invention.

Fig. 1 is a front view of the tonometer,

Fig. 2 is a side view of the same,

Fig. 3 is a section along the line III—III in Fig. 2,

Fig. 4 is an axial section through a part of the tonometer, along the line IV—IV in Fig. 2, Fig. 5 is a partial section along the line V—V in Fig. 3, Fig. 6 is a partial section along the line VI—VI in Fig. 3, Fig. 7 is a section along the line VII—VII in Fig. 4 and Fig. 8 shows a portion of Fig. 4 on a larger scale.

The illustrated tonometer has at its lower end a tube 1 in which a feeler 2 is axially displaceable. The tube 1 has a bottom plate 3 which is put with its lower spheric surface on the eyeball during the measurement of which a more detailed description is given later on. Above the bottom plate the tube 1 has lateral recesses 4 forming radial apertures through which lachrymal fluid that may enter into the tube 1 will flow out and therefore such fluid cannot possibly rise higher than to the level of the recesses 4. Above the recesses 4 three bearing jewels 5 are inserted in radial bores of the tube 1, such jewels contacting the feeler 2 practically without clearance in one point each thereby forming a bearing of extremely small area. In spite of the very small clearance of the bearing the feeler 2 may slightly be tilted out of its vertical mid-position. The upper wider end of the tube 1 is bolted to the lower cross bar 6 of a frame 7. A supporting plate 8 is pivoted on the cross bar 6 by means of the screw attachment illustrated in section in Fig. 5. When the supporting plate 8 is in the position shown in Fig. 3 the feeler 2 passes through a slit 8' of the plate 8 so that the feeler 2 is only allowed to slide downwardly until its collet 9 abuts against the upper surface of the plate 8. Therefore the feeler 2 is supported by the plate 8 and is prevented from sliding out of the tube 1. At its movable end the plate 8 has a lug 10 bent downwards and backwards so that the plate is secured in its working or supporting position shown in the drawings by friction on a stamping 11 of the cross bar 6. By overcoming this frictional engagement of the plate 8 on the cross bar 6 the plate 8 may be turned out in anticlockwise direction in Fig. 3 whereby the feeler 2 leaves the slit 8' and may be removed downwards from the tube 1.

By means of spacing rings 12 and of screws 13 two plates 14 are attached to the frame 7, a pointer 15 being pivoted by means of an axle 16 in jewels (not shown) inserted in each of the plates 14. The upper end of the pointer is adapted to run along a scale 17. A weight comprising an attaching lug 18 and a weight body 19 is attached to the lower end of the pointer 15. The weight body 19 has a bore with a conical portion 20, a jewel 21 having a downwardly opened conical bearing being inserted into the upper cylindrical portion of the bore. The upper conically tapered end of the feeler 2 passes through the conical bore portion 20 of the weight body 19 into the cone bearing of the jewel 21 and contacts this cone bearing along a circular line. It will be seen that the feeler 2 is guided without radial play as well in the cone bearing of the jewel 21 of the pointer weight 19 as in the jewels 5 of the tube 1 and may be axially displaced in the jewels 5 and may slightly be tilted out of its vertical mid-position in both bearings formed by the jewel 21 on one hand and by the jewels 5 on the other hand.

Additional weights 22 may loosely be applied onto the collet 9 of the feeler 2 as illustrated in Figs. 1 and 2. Such cylindrical additional weights preferably have a slit extending from the cylinder mantle to the cylinder axis into which slit the thin portion of the feeler above the collet 9 may enter, a cylindrical coaxial recess being provided at the one or both faces of the cylindrical weight into which recess the collet 9 will enter with ample clearance. For applying the additional weights they may be slid onto the feeler transversally to the same above its collet 9 (laterally in Fig. 2) and then they are slightly lowered so that the collet 9 enters into a cylindrical recess of the additional weight. By this simple operation the additional weight may be secured on the feeler 2 in central position and may be removed from the feeler in the same simple manner after the measurement.

For measurement the tonometer is suspended with two symmetrical shoulders 23 of its frame 7 in grooves 24 of two plugs 26 mounted on a supporting plate 25. The supporting plate 25 is seized with two fingers in its incisions 27 and kept in practically vertical position so that the tonometer is vertically suspended. In this position the tonometer is applied with its bottom plate 3 on the eyeball of the patient, whereby the feeler 2 which in its unloaded state had taken its lowermost position for which the collet 9 abuts against the supporting plate 8, also applies on the eyeball and is lifted so that its lower end reaches a position at least approximately flush with the spheric surface of the bottom plate 3. By this upward motion of the feeler 2 the weight 19 is lifted and the pointer 15 is turned in anticlockwise direction. In accordance with the intraocular pressure the feeler 2 will now slowly sink down thereby slightly deforming the horny coat of the eye, whereby the pointer 15 slowly turns back in clockwise direction. The amount of this backward motion of the pointer is considered as a measure of the intraocular pressure in a well known manner. During the just described motion of the tonometer mechanism (and of course as well during any other motion of this mechanism) in no place uncontrollable frictions or changes in the dimensions or transmission ratios of the mechanism can possibly occur so that adulteration of the measurement cannot occur. Lachrymal fluid which may rise into the tube 1 flows off through the openings formed by the recesses 4 and therefore cannot rise to the lower stationary bearing formed by the jewels 5. The friction on the jewels 5, between the feeler 2 and the jewel 21 of the pointer weight and in the jewel bearings of the pivot axle of the pointer is extremely small and cannot adulterate the measurement.

One of the most important features of the tonometer described above is the fact that the gravity center of the pointer system consisting of the pointer 15 and the counterweight 19 is at least approximately in the same horizontal plane with the pivot axis of the pointer system. Due to this feature, the gravity center of the pointer system is practically displaced in vertical direction throughout the relatively small angular range of the pointer motion and since the point of application of the feeler 2 on the pointer system is situated in the same horizontal plane as the pivot axis and the gravity center of the pointer system the lever-arm ratio $$\frac{\text{Pivot axis—point of application}}{\text{Pivot axis—gravity center}}$$

will remain exactly the same throughout the measuring range of the tonometer, that is for any angular position of the pointer system. It will be seen that when the pointer and its counterweight are turned out of the position illustrated in Fig. 4 for instance in clockwise direction, the point of application of the feeler is shifted downwardly and slightly to the left. Assuming that the gravity center of the pointer system is identical with the point of application of the feeler, which is practically so in the tonometer illustrated, the gravity center will be shifted on the same circular path as the application point of the feeler 2 and therefore the feeler always applies in the gravity center of the pointer system. Consequently the pressure transmitted from the pointer system to the feeler 2 is practically constant for any position of the pointer because due to the radial guide of the feeler in the pointer system the point of application of the feeler is shifted towards the pivot axis of the pointer system when the turning moment of the pointer system decreases. This sidewise shifting of the point of application of the feeler transversally to the feeler axis is possible due to the feature of this invention that the feeler is guided in one stationary bearing and in a bearing of the pointer system, such bearings having very small area and axial extension so that a slight tilting or swinging motion of the feeler in both bearings is possible.

In order to take full advantage of the forementioned measures taken for avoiding adulteration of the measurement care should be taken that the tonometer is held as quiet as possible in vertical position and that no external forces will apply on it. The supporting device of known tonometers comprises a ring axially slidable on the tube 1. This supporting device had the drawback that it was rather difficult to keep the tonometer quietly and correctly in its vertical measuring position and jamming of the supporting ring on the tube 1 would easily cause transmission of external forces onto the tonometer. These drawbacks of known supporting devices for tonometers cannot occur when the above described supporting plate 25 is used. When the tonometer has been put onto the eyeball for measurement the plugs 26 will leave the shoulders 23 of the frame 7 downwardly by such a distance that no vertically directed forces adulterating the measurement by changing the total pressure of the tonometer onto the eyeball may possibly be transmitted to the tonometer during measurement, even when the supporting plate is slightly moved up and down. On the other hand the frame 7 of the tonometer is held in the grooves 24 of the plugs 26 and therefore cannot move laterally for leaving its correct vertical position. While the known tonometers were supported at their lower or measuring end the tonometer according to this invention is supported at its upper end or its end opposite the measuring end, that is above its gravity center, and therefore it is much easier to keep the tonometer in its prescribed vertical position.

Instead of a detachable supporting plate 25 which is a separate part of the tonometer a similar plate might loosely but undetachably be mounted on the frame 7 of the tonometer.

While the invention has been described and illustrated with reference to a specific embodiment thereof, it will be understood that other embodiments may be resorted to without departing from the invention. Therefore, the form of the invention set out above should be considered as illustrative and not as limiting the scope of the following claims.

What I claim is:

1. A tonometer for measuring the intraocular pressure or the tension of the eyeball, comprising an axially displaceable feeler adapted to be put on the eyeball and a pointer system adapted to be actuated by the displacement of the said feeler, a stationary tube into which the said feeler is inserted, small-area bearings for the feeler in the said pointer system and in the said tube, such bearings allowing a slight swinging motion of the feeler axis but no radial play of the feeler, the said tube having a bottom plate adapted to be put onto the eyeball and radial openings between its bottom plate and the said bearing in the stationary part, a swing-out supporting plate for the feeler being arranged on top of the said tube, a slit in the said supporting plate through which the feeler passes when the supporting plate is in its supporting position, a collet on the said feeler above the said supporting plate, the supporting plate forming a stop for the said collet when in supporting position and allowing removal of the feeler from the said tube when swung out of its supporting position.

2. A tonometer for measuring the intraocular pressure or the tension of the eyeball, comprising a feeler axially displaceable in a vertical direction and having a measuring surface adapted to be put on the eyeball, a pointer system having a pointer, a pivot axis for the said pointer and a counter weight attached to the said pointer, the said pointer extending in a substantially vertical direction and having an upper end adapted to run along a measuring scale and a lower end below the said pivot axis, the said counter weight being located laterally of the said lower end of the pointer, a substantially conical recess in the said counter weight, a conical bearing surface in the said recess, an upper tipped end on the said feeler engaging the said conical bearing surface, a stationary tube into which the said feeler is inserted, small area bearings for the feeler in the said tube, the said conical bearing surface and the said small area bearings allowing a slight swinging motion of the feeler axis but no radial play of the feeler, the said pointer system having a center of gravity, the said pivot axis, the said center of gravity and the said tipped upper end of the feeler being located in a common approximately horizontal plane, the measuring pressure exerted onto the said measuring surface of the feeler being substantially constant and equal to the sum of the weight of the feeler and of the pressure transmitted from the pointer system to the feeler.

3. A tonometer for measuring the intraocular pressure or the tension of the eyeball, comprising a feeler axially displaceable and adapted to be put onto the eyeball, a pointer system having a pointer, a pivot axis for the said pointer, a pointer end spaced from the pivot axis and adapted to run along a measuring scale and an opposite pointer end near the said pivot axis, a portion having a substantially conical recess attached to the said pointer end near the pivot axis, a conical bearing surface at the ground of the said recess, a tipped end on the said feeler engaging the said conical bearing surface, a stationary tube into which the said feeler is inserted, a small area bearing for the feeler in the said tube, the said conical bearing surface and the said small area bearings allowing a slight swinging motion of the feeler axis but no radial play of the feeler, the said pivot axis of the pointer and the said tipped upper end of the feeler engaging the said conical bearing surface being located in a plane substantially perpendicular to the axis of the said feeler.

4. A tonometer for measuring the intraocular pressure or the tension of the eyeball, comprising a feeler axially displaceable in a vertical direction and having a measuring surface adapted to be put on the eyeball, a pointer system having a pointer, a pivot axis for the said pointer and a substantially conical recess in the said pointer system, a conical bearing surface in the said recess, an upper tipped end on the said feeler engaging the said conical bearing surface, a stationary tube into which the said feeler is inserted, small area bearings for the feeler in the said tube, the said conical bearing surface and the said small area bearings allowing a slight swinging motion of the feeler axis but no radial play of the feeler, the said pointer system having a center of gravity, the said pivot axis, the said center of gravity and the said tipped upper end of the feeler being located in a common approximately horizontal plane, the measuring pressure exerted onto the said measuring surface of the feeler being substantially constant and equal to the sum of the weight of the feeler and of the pressure transmitted from the pointer system to the feeler.

5. A tonometer for measuring the intraocular pressure or the tension of the eyeball, comprising an axially displaceable feeler having a substantially flat measuring surface adapted to be put on the eyeball, a pointer system adapted to be rotated by the displacement of the said feeler, a stationary tube into which the said feeler is inserted, a bottom plate adapted to be applied onto the eyeball, on the said tube, first radial apertures in the said tube near the said bottom plate, jewels fixedly inserted into such first radial apertures and forming small area bearings for the said feeler near the said bottom plate, second apertures in the said tube between the said bottom plate and the said jewels, a pivot axis for the said pointer system and a small area bearing in the said pointer system, a pointed end on the said feeler opposite the said measuring surface, the said pointed end of the feeler engaging the said small area bearing of the pointer system, the said small area bearings formed by the said jewels and the said small area bearing of the pointer system allowing a slight swinging motion of the feeler axis but guiding the feeler without radial play near its ends, a first portion of the said feeler forming a first lever arm between the said jewels and the said measuring surface and a second portion of the said feeler forming a second lever arm between the jewels and the said pointed end respectively, the said first lever arm being substantially smaller than the said second lever arm so that displacements of the said pointed end of the feeler transversally to the feeler axis due to rotation of the pointer system are transmitted to the measuring surface at a low transmission ratio and the angular displacement of the feeler axis due to such transversal displacements of its pointed end being small due to the length of the said second lever arm.

6. A tonometer for measuring the intraocular pressure or the tension of the eyeball, comprising an axially displaceable feeler having a substantially flat measuring surface adapted to be put on the eyeball, a pointer system adapted to be rotated by the displacement of the said feeler, a stationary tube into which the said feeler is inserted, a bottom plate adapted to be applied onto the eyeball on the said tube, small area bearings for the said feeler in the said tube near the said bottom plate, a pivot axis for the said pointer system and a small area bearing in the said pointer system, a pointed end on the said feeler opposite the said measuring surface, the said pointed end of the feeler engaging the said small area bearing of the pointer system, the said small area bearings and the said small area bearing of the pointer system allowing a slight swinging motion of the feeler axis but guiding the feeler without radial play near its ends, a first portion of the said feeler forming a first lever arm between the said small area bearing places and the said measuring surface and a second portion of the feeler forming a second lever arm between the small area bearings and the said pointed end respectively, the said first lever arm being substantially smaller than the said second lever arm so that displacements of the said pointed end of the feeler transversally to the feeler axis due to rotation of the pointer system are transmitted to the measuring surface at a low transmission ratio and the angular displacement of the feeler axis due to such transversal displacements of its pointed end being small due to the length of the said second lever arm.

7. A tonometer for measuring the intraocular pressure or tension of the eyeball, comprising an axially displaceable feeler adapted to be put onto the eyeball and a pointer system adapted to be actuated by the displacement of the said feeler, a stationary portion having a bottom plate adapted to be put onto the eyeball and an end opposite the said bottom plate, the said stationary portion comprising a frame having two legs diverging towards the said end opposite the bottom plate, a plate-shaped supporting device having two laterally projecting plugs, a supporting position for the said supporting device for which each of the said plugs engages one of the said legs for supporting the frame and a medium position for the said supporting device for which the said frame is not supported but laterally secured by the said plugs and a disengaged position for the said supporting device in which the said plugs are completely disengaged from the frame.

8. A tonometer according to claim 7, the said plugs having grooves adapted to take up and laterally secure the legs of the frame when the said supporting device is in its supporting position.

9. A tonometer for measuring the intraocular pressure or tension of the eyeball, comprising an axially displaceable feeler having a substantially flat measuring surface adapted to be put on the eyeball, a pointer system having a pivot axis and being adapted to be rotated by axial displacement of the said feeler, a stationary tonometer part, one single small area bearing for the said feeler in the said pointer system and small area bearing means located in a single common radial plane relative to the said feeler in the said stationary tonometer part, the small area bearing of the pointer system and the said bearing means allowing a slight swinging motion of the feeler axis but no radial displacement of the feeler in the small area bearing and small area bearing means respectively, one single point of application for the said feeler formed by the said small area bearing of the pointer system, the said pivot axis of the pointer system and the said point of application being in a plane substantially perpendicular to the feeler axis, frictional resistances opposing adjustment of the tonometer during measurement being only possible between the feeler and the said small area bearing means of the stationary part and on the said pivot axis of the pointer system.

References Cited in the file of this patent
UNITED STATES PATENTS

| | | |
|---|---|---|
| 1,331,777 | Many | Feb. 24, 1920 |
| 1,409,870 | Lauer | Mar. 14, 1922 |
| 1,441,129 | Smith et al. | Jan. 2, 1923 |
| 2,314,514 | Parsons | Mar. 23, 1943 |